United States Patent

[11] 3,625,938

[72] Inventor Ved Parkash Kubba
Bombay, India
[21] Appl. No. 705,027
[22] Filed Feb. 13, 1968
[45] Patented Dec. 7, 1971
[73] Assignee Ciba Limited
Basel, Switzerland
[32] Priorities Feb. 21, 1967
[33] Switzerland
[31] 2515/67;
Jan. 5, 1968, Switzerland, No. 120/68

[54] PHENYL-AZO-PHENYL DYESTUFFS
6 Claims, No Drawings

[52] U.S. Cl. .................................. 260/205,
260/158, 260/206, 260/207, 260/207.1,
260/207.5, 260/471 A, 260/490, 260/556, 8/4,
8/5, 8/41 R, 8/41 A, 8/41 B, 8/41 C, 8/41 D, 8/50
[51] Int. Cl. ..................................... C07c 107/06,
C09b 29/06
[50] Field of Search .......................... 260/205,
206, 207, 207.1, 207.5

[56] References Cited
UNITED STATES PATENTS

| | | | |
|---|---|---|---|
| 2,955,901 | 10/1960 | Kruckenberg | 260/205 X |
| 3,268,507 | 8/1966 | Kruckenberg | 260/207 |
| 3,359,256 | 12/1967 | Mueller et al. | 260/206 X |
| 3,379,716 | 4/1968 | Wallace et al. | 260/207.1 |

*Primary Examiner*—Charles B. Parker
*Assistant Examiner*—Charles F. Warren
*Attorneys*—Harry Goldsmith, Joseph G. Kolodny, Bryant W. Brennan and Edward J. Sites ABSTRACT: Monoazo dyestuffs of the formula

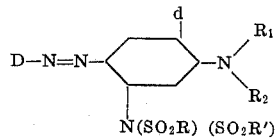

wherein D monocyclic or bicyclic diazo residue; $d$ is hydrogen, alkyl, or alkoxy; R is alkyl, R' is alkyl or aryl; and $R_1$ and $R_2$ are hydrogen, alkyl, alkyl-carbonyloxy alkyl, hydrogen ethyl or cyanoethyl only one of $R_1$ and $R_2$ being hydrogen at one time. The dyestuffs are useful for dyeing polyester fibers.

PHENYL-AZO-PHENYL DYESTUFFS

The present invention relates to new and valuable dyestuffs which contain at least one disulfonylamino group of the formula $-N(SO_2R)_2$, particularly azo dyestuffs in which at least one azo or diazo component contains at least one disulfonylamino group of the formula $-N(SO_2R)_2$ bound to an aromatic nucleus externally, but preferably directly, in which formula R represents the radical of an organic monosulfonic acid which has been freed from the sulfone group, preferably an alkyl radical.

The new dyestuffs may be obtained either by a. using at least one diazo or azo component containing at least one disulfonylamino residue of the formula $-N(SO_2R)_2$ during manufacture, which is effected by coupling, or b. by sulfonylating the already formed azo dyestuff, which contains at least one unsubstituted amino group or sulfonylamino group of the formula $-NH(SO_2R)$ preferably bound directly to the aromatic nucleus, at the free hydrogen atoms of the said amino group to form the disulfonyl derivative.

The invention relates, in particular, to water-insoluble monoazo dyestuffs of the formula D—N=N—A, in which D represents a benzene residue or a heterocyclic residue and A represents a benzene residue containing a substituted amino group which is preferably in para-position to the azo group, and in which at least one of the two residues D and A, but preferably A, contains as substituent at least one group of the formula $-N(SO_2R)_2$, in which R has the meaning given above.

Dyestuffs which are of special interest are those of the formula

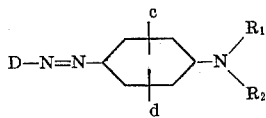

in which c is bound preferably in a position vicinal to the amino group and d is bound preferably in a position vicinal to the azo group, and in which c and d represent hydrogen atoms, halogen atoms, low alkyl and alkoxy groups, for example, methyl, ethyl, methoxy and ethoxy groups, arylthio and aryloxy residues, for example, phenylmercapto and phenoxy residues or residues of the formulas $-N(SO_2R)_2$ or $-NH-SO_2R$, in which R represents an organic residue, preferably an alkyl residue having one to 18 carbon atoms, $R_1$ represents a hydrogen atom, the group of the formula $-SO_2R$ or preferably an alkyl group which may be substituted especially the group -alkylene—$N(SO_2R)_2$, and $R_2$ represents an alkyl group which may be substituted or an acyl group, especially the group of the formula $-SO_2R$ or -alkylene—$N(SO_2R)_2$. When $R_1$ and $R_2$ do not contain $-SO_2R$ groups and D contains no $-N(SO_2R)_2$ groups, c is an $-N(SO_2R)_2$ group.

The groups $R_1$ and $R_2$ may be low alkyl groups containing one to four, but preferably two to four, carbon atoms, for example, methyl, ethyl, n-propyl or n-butyl groups which may be substituted in the usual manner, for example, halogenated alkyl groups, for example, β-chloroethyl, β, β, β-trifluoroethyl or β, γ-dichloropropyl groups, β-cyanoethyl groups, alkoxyalkyl groups, for example, β-ethoxyethyl or δ-methoxybutyl groups, hydroxyalkyl groups, for example, β-hydroxyethyl or β, γ-dihydroxypropyl groups, nitroalkyl groups, for example, β-nitroethyl groups, carbalkoxy groups, for example, β-carbo-(methoxy-, ethoxy- or propoxy)-ethyl groups (in which the terminal alkyl group may carry cyano, carbalkoxy, acyloxy or amino groups in ω-position), β- or γ-carbo-(methoxy- or ethoxy)-propyl groups, acylaminoalkyl groups, for example, β-(acetyl- or formyl)-aminoethyl groups, acyloxyalkyl groups, for example, β-acetyloxyethyl or β, γ-diacetoxypropyl groups, β-(alkyl- or aryl)-sulfonylalkyl groups, for example, β-methanesulfonyl-ethyl, β-ethanesulfonylethyl or β-(para-chlorobenzenesulfonyl)-ethyl groups, alkyl- or arylcarbamoyloxyalkyl groups, for example, β-methylcarbamyloxyethyl or β-phenylcarbamyloxyethyl groups, alkyloxy-carbonyloxyalkyl groups, for example, β-(methoxy-, ethoxy- or isopropyloxy)-carbonyloxyethyl groups, and γ-acetamidopropyl, β-(para-nitrophenoxy)-ethyl, β-(para-hydroxyphenoxy)-ethyl, β-(β'-acetylethoxycarbonyl)ethyl, β-[β'-(cyano-, hydroxy-, methoxy- or acetoxy)-ethoxycarbonyl]-ethyl, cyanoalkoxyalkyl, β-carboxyethyl, β-acetylethyl, γ-aminopropyl, β-diethylaminoethyl, β-cyanoacetoxyethyl and β-benzoxyl-β-(para-alkoxy- or phenoxybenzoylhydroxyethyl) groups. These groups generally contain not more than nine carbon atoms.

Suitable azo components containing $-N(SO_2R)_2$ groups are, for example, the tertiary amines of the formulas

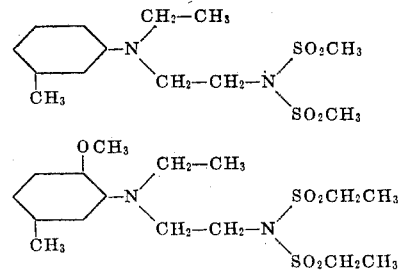

and especially the amines of the formulas

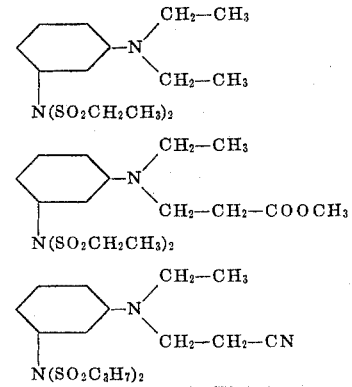

The preferred diazo component D—$NH_2$ is an aminobenzene, especially one of the formula

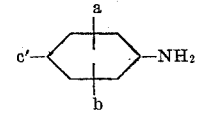

in which a is in 3-position, but preferably in 2-position and b is in 6-position, but preferably in 5-position and a represents a hydrogen or a halogen atom or an alkyl group, an alkoxy group, a phenoxy group, a nitro group, a cyano group, a carbalkoxy group, an N-mono- or N,N-dialkylsulfonamide group or an alkylsulfone group, b represents a hydrogen or a halogen atom or an alkyl group, a cyano group or a trifluoromethyl group and c' represents a hydrogen or a halogen atom or an alkyl group, an N-mono- or N,N-dialkylsulfonamide group, a carbalkoxy group or an alkylsulfonyl group and especially a nitro group, or a, b and/or c' represent the above-mentioned $-N(SO_2R)_2$ group.

The following may be mentioned as examples: aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulfonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-chloro-4-carbethoxybenzene, 1-amino-2-phenoxy-4-nitrobenzene, 1-amino-2-chloro-4-methylsulfonylbenzene and 1-amino-2-methylsulfonyl-4-chlorobenzene.

1-amino-2-methylsulfonyl-4-nitrobenzene, 1-amino-2,4-dinitrobenzene, 1-amino-2,4-dicyanobenzene, 1-amino-2-cyano-4-methylsulfonylbenzene, 1-amino-2,6-dichloro-4-cyanobenzene, 1-amino-2,6-dichloro-4-nitrobenzene, 1-amino-2,4-dicyano-6-chlorobenzene, 1-amino-2,4-dinitro-6-chlorobenzene and especially 1-amino-2-cyano-4-nitrobenzene; furthermore, 1-aminobenzene-2- or -4-sulfonic acid amides, for example, N-methyl or N,N-dimethyl or diethyl amide.

The following amines may be mentioned from the heterocyclic diazo component series:
2-aminothiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 2-amino-6-chlorobenzthiazole, 2-amino-6-methylsulfonylbenzthiazole, 2-amino-6-cyanobenzthiazole, 2-amino-6-nitrobenzthiazole, 2-amino-1,3,4-thiadiazole, 5-amino-3-phenyl-1,2,4-thiadiazole, 2-amino-1,3,5-thiadiazole and especially 2-amino-5-nitrothiazole.

MANUFACTURING PROCESS (a)

Diazotization of the above-mentioned diazo components may be carried out by known methods, for example, with the aid of a mineral acid and sodium nitrate or, for example, with a solution of nitrosyl sulfuric acid in concentrated sulfuric acid.

Coupling may likewise be carried out in known manner, for example, in a neutral to acid medium, if necessary, in the presence of sodium acetate or a similar buffer which influences the rate of coupling, or a catalyst, for example, pyridine, or a salt thereof.

After coupling, the dyestuff formed may easily be isolated from the coupling mixture, for example, by filtration, because it is virtually insoluble in water.

The new components required for the coupling process are prepared in the following manner:

N-sulfonylation of sulfonylamino groups or preferably unsubstituted amino groups, which are preferably bound directly to an aromatic nucleus, is carried out by known methods, especially by reaction with the corresponding sulfonyl halides R—SO$_2$—hal, in which R has the meaning given above, but is preferably an alkyl group, especially a low-molecular alkyl group having up to four carbon atoms. N-sulfonylation may be carried out in an inert organic solvent or in a tertiary amine, for example, pyridine, or especially in an aqueous medium when the azo or diazo component is used as starting material, in which case it is expedient to add an acid acceptor, for example, a tertiary amine.

In addition to the aromatic monosulfonic acid halides, for example, paratoluenesulfonic acid chloride and parabromobenzenesulfonic acid chloride, mention may also be made, in particular, of the sulfonic acid chlorides with low alkyl groups, especially those having a methyl or ethyl group.

MANUFACTURING PROCESS (b)

When an azo dyestuff which has already been formed is used as starting material it must contain at least one monosulfonylamino group or preferably an unsubstituted amino group. By starting from monoalkylsulfonyl-amino groups in the starting dyestuffs, such as are described, for example in French Pat. No. 1,350,486, in British Pat. No. 865,409 or in German Pat. No. 1,078,992, it is possible by reaction with an aromatic monosulfonic acid halide to obtain dyestuffs whose amino group carries both an aryl-sulfonyl group and an alkylsulfonylamino group. Since preference is given to water-insoluble azo dyestuffs, N-sulfonylation is preferably carried out in an organic solvent in the case of azo dyestuffs.

When the amount of sulfonic acid halide used is less than that required to bring about twofold substitution of all unsubstituted amino groups, a mixture of the monosulfonylaminoazo dyestuff and the disulfonylamino-azo dyestuff is obtained, which, however, may also be produced by subsequent mixing.

The new dyestuffs, mixtures thereof, and mixtures of the new dyestuffs with other azo dyestuffs are eminently suitable for dyeing and printing synthetic fibers, especially when they have been converted into a state of fine division, for example, by grinding, pasting, reprecipitation, and so forth. This invention therefore also relates to a process for dyeing or printing synthetic fibers, for example, acrylic fibers or acrylonitrile fibers, or fibers of polyacrylonitrile or of mixed polymers of acrylonitrile and other vinyl compounds, such as acrylic esters, acrylic amides, vinylpyridine, vinyl chloride or vinylidene chloride, mixed polymers of dicyanoethylene and vinyl acetate, or of acrylonitrile block copolymers, fibers of polyurethanes, cellulose tri- or 2½-acetate, polyamides, such as nylon 6, nylon 6,6 or nylon 10, and especially fibers of aromatic polyesters, such as fibers of terephthalic acid and ethylene glycol or 1,4-dimethylolcyclohexane, and mixed polymers of terephthalic acid and isophthalic acid and ethylene glycol, in which process use is made of azo dyestuffs which contain at least one disulfonylamino group of the formula —N(SO$_2$R)$_2$, particularly azo dyestuffs in which at least one azo or diazo component contains at least one disulfonylamino group of the formula —N(SO$_2$R)$_2$ bound to an aromatic nucleus externally, but preferably directly, in which formula R represents the radical of an organic monosulfonic acid which has been freed from the sulfone group, preferably an alkyl radical.

As a rule, the new dyestuffs have a greater affinity to polyester fibers which are the preferred substrate than to the corresponding monosulfonylamino derivatives. They produce pure, strong dyeings possessing an excellent fastness to light and to sublimation on aromatic polyester fibers when applied by the usual dyeing processes, for example, when applied in the form of a fine dispersion in a dyebath, which advantageously contains a dispersing agent, at a temperature close to 100° C., if necessary, in the presence of a swelling agent, or at a temperature above 100° C. under superatmosphere pressure. The fastness to light and sublimation as a rule surpasses that of the monosulfonylamino derivatives, the new dyestuffs also have the advantage that they produce only very slight staining on any wool, acetate, nylon, or other fibers that may be present in the dyebath, and are thus very suitable for dyeing polyester/wool, and especially polyester/triacetate and polyester/nylon mixtures; reservation of acetate and nylon is better than that of comparable dyestuffs.

The dyestuffs of the invention are also suitable for application by the so-called Thermosol process in which the material to be dyed is impregnated at a temperature not exceeding 60° C. with an aqueous dispersion of the dyestuff which advantageously contains 1 to 50 percent of urea and a thickening agent, especially sodium alginate, and then squeezed in the usual manner, advantageously in a manner such that the impregnated material retains 50 to 100 percent of its dry weight of dyeliquor. To fix the dyestuff, the impregnated fabric is dried, for example, in a current of warm air, and then heated to a temperature above 100° C., for example, to a temperature between 180° and 210° C.

The Thermosol process is specially suitable for dyeing union fabrics made from polyester fibers and cellulosic fibers, especially cotton and also, in particular, unions made from polyester and nylon or acetate fibers. Special mention should be made of their greater affinity and superior fastness to light compared with similar dyestuffs.

The dyestuffs of this invention are also suitable for dyeing textile materials, especially union fabric from suitable cellulose-based fibers and fully synthetic fibers, which are finished by the so-called "Permanent-Press" or "Durable-Press" process. In these processes, a curable precondensate is applied to the dyed fabric together with an at least potentially acid or latently acid catalyst, and the final shape is given the wearing apparel by condensing the artificial resin finish. Such a process is described, for example in U.S. Pat. No. 2,974,432.

Some of the new products are also valuable pigments which can be used for a very wide variety of purposes. For example, they can be used in a state of fine division for the spin-coloration of filament and staple-fiber viscose, cellulose ethers and esters, polyamides, polyurethanes and polyesters, and in the production of colored lacquers or lake-formers, solutions and products made from acetylcellulose, nitrocellulose and natural resins and synthetic resins, for example, polymerization resins or condensation resins, for example, aminoplasts, alkyd resins, phenoplasts and polyolefins, for example, polystyrene, polyvinyl chloride, polyethylene, polypropylene and polyacrylonitrile, rubber, casein, silicones and silicone resins.

The following examples illustrate the invention. Unless otherwise stated, the parts and percentages are by weight.

I. Manufacture of the Starting Components

Example 1

28.63 Parts of methanesulfonyl chloride and 25.3 parts of triethylamine as acid acceptor are added to a solution of 13.6 parts of meta-amino-N,N-dimethylaniline in 600 parts of anhydrous benzene. The solution is boiled under reflux for 12 to 15 hours. The solvent is distilled under reduced pressure, and the residue is dissolved in 25 parts by volume of ether to isolate unreacted starting material. The ether solution is decanted and the brown residue is recrystallized three times from dilute alcohol. 15.1 parts of meta-bis-(N'-methanesulfonyl)amino-N,N-dimethylaniline are obtained in the form of white platelets melting at 154° to 155° C.

Example 2

A solution of 10.0 parts of sodium hydroxide in 30 parts of water and 28.63 parts of methanesulfonyl chloride are added simultaneously in the course of 45 minutes to a suspension of 13.6 parts of meta-amino-N,N-dimethylaniline in 200 parts of water, which suspension is kept at a temperature of 10° C. The mixture is stirred for 2 to 3 hours. The water is decanted and the viscous residue is treated with 30 parts of ether. The solid brown residue obtained is recrystallized twice from dilute alcohol. 12.7 Parts of meta-bis(N'-methanesulfonyl)amino-N,N-dimethylaniline are obtained in the form of white platelets melting at 154° to 155° C.

Example 3

Methanesulfonyl chloride is reacted with a solution of 16.4 parts of meta-amino-N,N-diethylaniline in the manner described in example 1. 16.5 Parts of meta-bis(N'-methanesulfonyl)-amino-N, N- diethylaniline are obtained in the form of white platelets melting at 151° to 152° C.

Example 4

Methanesulfonyl chloride is reacted with 16.4 parts of meta-amino-N,N-diethylaniline in the manner described in example 2. 11.0 Parts of meta-bis(N'-methanesulfonyl)amino-N,N-diethylaniline are obtained in the form of white platelets melting at 151° to 152° C.

Example 5

The procedure is an in example 1, except that the methanesulfonyl chloride is replaced by an equivalent quantity of ethanesulfonyl chloride and that toluene is used as solvent. A brown solid residue is obtained which when recrystallized yields the crystalline meta-bis(N'-diethylsulfonyl)amino-N,N-dimethylaniline melting at 111°–112° C.

Example 6

From an equivalent quantity of meta-amino-N,N-diethylaniline there is obtained the procedure of example 5 pure meta-bis(N'-diethylsulfonyl)amine-N,N-diethylaniline melting at 106°–107° C.

Example 7

A solution of 0.1 mol of N-(N'-methanesulfonyl-2-aminoethyl)-N-ethyl-meta-toluidine (prepared according to Journal of the American Chemical Society, Vol. 73, page 3100 (1951) in 400 parts of xylene (dried over sodium metal) is treated with 0.15 mol of lithium metal and refluxed for 80–100 hours. When the batch has cooled a slight excess over 0.15 mol of methane sulfonyl chloride is added and the mixture refluxed for 8 hours. After cooling, the batch is filtered and the precipitated lithium chloride washed with dry benzene. The solvents are combined and evaporated and the residue distilled under reduced pressure. After the first fraction, which consists of unchanged starting material, there is obtained N-β-N',N'-dimethanesulfonylamino)ethyl-N-ethyl-meta-toluidine of the formula

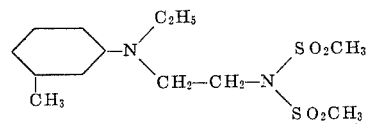

which boils at 203°–212° C. under a pressure of 0.8 mm.Hg

Analysis:  Calculated   C 46.70;  H 6.63;  N 8.38%
           found        C 47.50;  H 6.43;  N 8.06%

II. Manufacture of the Dyestuffs

Example I 4.31 Parts of 2-chloro-4-nitraniline are diazotized at room temperature with nitrosylsulfuric acid prepared from 40 parts by volume of concentrated sulfuric acid and 2 parts of sodium nitrite. The excess of nitrous acid is destroyed with urea and the reaction mixture is filtered. The solution obtained is coupled at 5° to 10° C. with 7.3 parts of meta-bis(N'-methanesulfonyl)amino-N,N-dimethylaniline in a mixture of 40 parts of alcohol and 250 parts of water, the batch being stirred for 5 hours or longer until coupling is finished. The pH value is adjusted to 4 to 5 at a temperature of below 10° C. with a 4N sodium acetate solution and the dyestuff is isolated by filtration and washed with a large amount of water. Subsequently, the dyestuff is suspended in 500 parts of water, the suspension is rendered alkaline with a small amount of sodium carbonate solution and then acidified with acetic acid. In some cases it may be necessary, in order to remove starting material and impurities, to treat the dyestuff with acetone and to precipitate the dissolved dyestuff with water. The dyestuff obtained, which corresponds to the formula

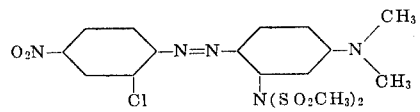

dyes polyester fibers red-violet tints possessing excellent properties of fastness when applied in the form of an aqueous dispersion.

DYEING PRESCRIPTION

1 Part of the dyestuff obtained in the manner described above is ground wet with 2 parts of a 50 percent aqueous solution of the sodium salt of dinaphthylmethanedisulfonic acid and the batch is then dried.

The dyestuff preparation so obtained is mixed with 40 parts of a 10 percent aqueous solution of the sodium salt of N-benzyl-μ-heptadecylbenzimidazoledisulfonic acid and then 4 parts of an acetic acid solution of 40 percent strength are added. A dyebath of 4,000 parts is prepared therefrom by dilution with water.

100 Parts of cleansed polyester fiber material are entered into this dyebath at 50° C., the temperature is raised to 120° C to 130° C. within 30 minutes and dyeing is carried out for one hour at that temperature in a closed vessel. The material is subsequently well rinsed. A strong, pure, red-violet dyeing possessing an excellent fastness to light and to sublimation is obtained.

diazonium salt is coupled in the manner described in example 1. The dyestuff obtained, which corresponds to the formula

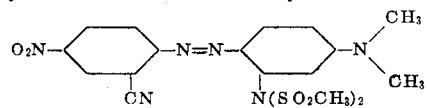

dyes polyester fibers violet tints possessing excellent properties of fastness when applied in the form of an aqueous dispersion.

The following table lists components of further dyestuffs which are obtained when the diazo component shown in column 3. Column 4 indicates the tint obtained on polyester fibers.

| Example No. | Column 2 | Column 3 | Column 4 |
|---|---|---|---|
| IV | $O_2N-\langle\rangle-NH_2$ | $-N(CH_3)_2$ with $N(SO_2CH_3)_2$ | Reddish yellow. |
| V | $O_2N-\langle\rangle(NO_2)-NH_2$ | Same as above | Claret. |
| VI | $O_2N-\langle\rangle(CH_3)-NH_2$ | do | Red. |
| VII | $O_2N-\langle\rangle(OCH_3)-NH_2$ | do | Do. |
| VIII | $O_2N-\langle\rangle(SO_2CH_3)-NH_2$ | do | Reddish violet. |
| IX | $CH_3O_2S-\langle\rangle(Cl)-NH_2$ | do | Yellowish red. |
| X | $O_2N-\langle\rangle(Br)(NO_2)-NH_2$ | do | Violet. |
| XI | $O_2N-\langle\rangle(Cl)(NO_2)-NH_2$ | do | Do. |

Example II 5.17 Parts of 2,6-dichloro-4-nitraniline are diazotized in the manner described in example 1, and the filtered solution of the diazonium salt is coupled and worked up in the manner described in that example.

The dyestuff obtained, which corresponds to the formula

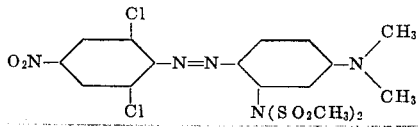

dyes polyester fibers blue-red tints possessing excellent properties of fastness when applied in the form of an aqueous dispersion.

Example III 4.1 Parts of 2-cyano-4-nitraniline are diazotized in the manner described in example 1, but with an addition of 10 parts by volume of acetic acid. The filtered solution of the

Example XII 4.1 Parts of 2-cyano-4-nitraniline are diazotized in the manner described in example 3. The filtered solution of the diazonium salt is coupled with 8 parts of meta-bis (N′-methanesulfonyl)amino-N,N-diethylaniline in the manner described in example 1 and worked up. The dyestuff so obtained, which corresponds to the formula

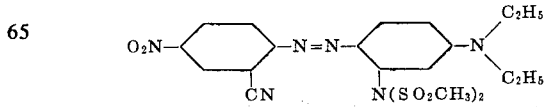

dyes polyester fibers blue-violet tints when applied in the form of an aqueous suspension.

The following table lists components of further dyestuffs which are obtained when the diazo components shown in column 2 are diazotized and coupled with the coupling components shown in column 3. The tints obtained with the dyestuffs on polyester fibers are indicated in column 4.

3,625,938

| Example No.: | Column 2 | Column 3 | Column 4 |
|---|---|---|---|
| XIII | $O_2N-\phenyl-NH_2$ | 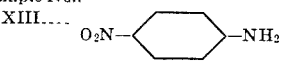 (cyclohexyl with $N(C_2H_5)_2$ and $N(SO_2CH_3)_2$) | Red. |
| XIV | $O_2N-\phenyl(Cl)-NH_2$ | Same as above | Blue red. |
| XV | $O_2N-\phenyl(NO_2)-NH_2$ | ...do... | Red-violet. |
| XVI | $O_2N-\phenyl(CH_3)-NH_2$ | ...do... | Red. |
| XVII | $O_2N-\phenyl(OCH_3)-NH_2$ | ...do... | Red. |
| XVIII | $O_2N-\phenyl(SO_2CH_3)-NH_2$ | ...do... | Violet. |
| XIX | $CH_3O_2S-\phenyl(Cl)-NH_2$ | ...do... | Yellow-red. |
| XX | $O_2N-\phenyl(Cl,Cl)-NH_2$ | ...do... | Blue-red. |
| XXI | $O_2N-\phenyl(Br,NO_2)-NH_2$ | ...do... | Violet. |
| XXII | $O_2N-\phenyl(Cl,NO_2)-NH_2$ | ...do... | Do. |

Example XXIV 2.16 parts of 2-chloro-4-nitro-aniline are diazotized at room temperature with nitrosylsulfuric acid prepared from 20 parts by volume of concentrated sulfuric acid and 1 part of sodium nitrite. The excess nitrous acid is destroyed with urea, and the reaction mixture is filtered. The resulting solution is coupled at 5°–10° C. with 4.17 parts of N-β-[(N′,N′-dimethanesulfonyl)-amino]-ethyl-N-ethyl-metatoluidine in a mixture of 20 parts of alcohol and 120 parts of water, then stirred for at least 7 hours until coupling is complete, and the pH then adjusted to 4–5 by the addition of 4N-sodium acetate solution at a temperature below 10° C. The dyestuff which precipitates is filtered off, washed with much water, dissolved in acetone, and precipitated with water. A dyestuff of the formula

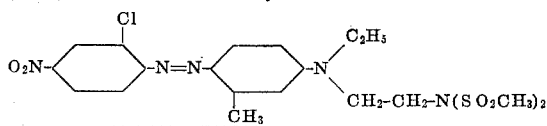

is obtained which dyes polyester fibers bluish red tints having excellent fastness properties.

Example XXV

The procedure is that of example XXIV except for the use as diazo component of 2.6 parts of 2,6-dichloro-4-nitroaniline. The dyestuff of the formula

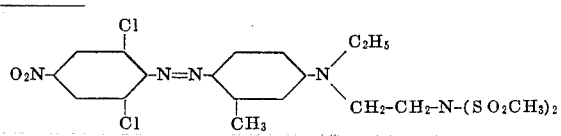

is obtained which dyes polyester fibers yellowish red shades having excellent fastness properties.

Example XXVI 2.05 parts of 2-cyano-4-nitro-aniline are diazotized as described in example XXIV, but with the addition of 5 parts by volume of acetic acid. Coupling and working up gives the dyestuffs of the formula

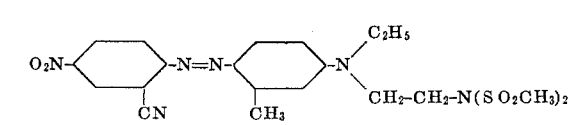

which dyes polyester fibers bordeaux-red shades having excellent fastness properties.

Example XXVII

When the procedure of example XXIV is followed and N-β-[(N′,N′-dimethanesulfonyl)amino-ethyl-N-ethyl-metatoluidine] replaced by the N′,N′-diethanesulfonylamino derivative there is obtained on working up the dyestuff of the formula

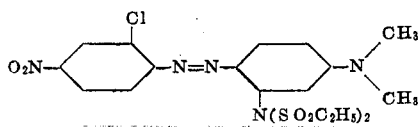

which dyes polyester fibers bluish-red shades having excellent fastness properties.

The table below lists further dyestuffs that are obtained by diazotizing the diazo components of column 2 and coupling the product with the coupling components of column 3. Column 4 shows the shades of the dyeings on polyester fibers obtained with the resulting dyestuffs.

| | Column | | |
|---|---|---|---|
| Example No.: | 2 | 3 | 4 |
| XXVIII | O₂N—⟨⟩—NH₂ | ⟨⟩—N(CH₃)(CH₃), N(SO₂C₂H₅)₂ | Yellowish-red. |
| XXIX | O₂N—⟨Cl,Cl⟩—NH₂ | Same as above | Do. |
| XXX | O₂N—⟨⟩—NH₂ | ⟨⟩—N(C₂H₅)(C₂H₅), N(SO₂C₂H₅)₂ | Red. |
| XXXI | O₂N—⟨Cl⟩—NH₂ | Same as above | Bluish-red. |
| XXXII | O₂N—⟨Cl,Cl⟩—NH₂ | ...do... | Yellowish-red. |
| XXXIII | O₂—⟨NO₂⟩—NH₂ | ...do... | Violet-red. |

CONTINUOUS DYEING OF POLYESTER FABRICS 20 parts of 4-(2'-chloro-4'-nitrophenyl-azo)-5(N',N'-diethylsulfonyl)-amino-N,N-dimethylaniline are ground with 140 parts of water containing 40 parts of sodium dinaphthyl-methanedisulfonate.

A padding liquor is prepared from 200 parts of the above dyestuff preparation, 100 parts of carboxymethyl cellulose (4 percent aqueous solution) and 700 parts of water, by stirring the preparation into the previously prepared thickening, using a high-speed stirrer, and then adjusting the pH to 6 by means of 80 percent acetic acid. A polyester fabric is padded in the resulting liquor at 30° C. and squeezed so as to retain 60 percent of its weight of liquor, then dried at 70°–80° C. The fabric is then heated on a stenter at 210° C. for 60 seconds, washed hot and rinsed well with cold water. A brown-red dyeing is obtained which has good fastness properties.

Example XXXIV

To a solution of m-amino-N,N-dimethylaniline (13.6 parts) in dry benzene (400 parts) was added benzene sulfonyl chloride (19.5 parts) and an acid binding agent, triethylamine (30.0 parts). The solution was boiled at reflux for 15 hours. It was filtered and the solvent was removed under reduced pressure. The brown solid was crystallized three times from dilute alcohol to give white needles of meta-(N'-benzene-sulfonyl)-amino-N,N-dimethylaniline

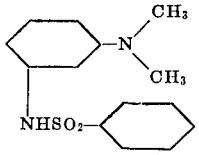

To a solution of meta-(N'-benzene-sulfonyl)-amino-N,N-dimethylaniline (15.4 parts) in dry benzene (400 parts) was added methane sulfonyl chloride (13.4 parts) and an acid binding agent, triethylamine (20.0 parts). The solution was boiled at reflux for 20 hours. It was filtered and the solvent was removed under reduced pressure. The brown solid was crystallized from alcohol (95 percent) to give white needles of meta-(N'-benzene-sulfonyl-N'-methane-sulfonyl)-amino-N,N-di-methylaniline, m.p. 106°–107° C.

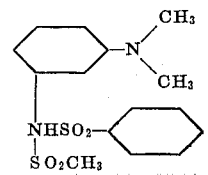

1.73 parts of 2-chloro-4-nitro aniline are diazotized at room temperature with nitrosylsulfuric acid prepared from 20 parts by volume of concentrated sulfuric acid and one part of sodium nitrite. The excess of nitrous acid is destroyed with urea and the reaction mixture is filtered. The solution obtained is coupled at 5° to 10° C. with 3.54 parts of meta-(N'-benzene-sulfonyl-N'-methane-sulfonyl)-amino-N,N- dimethylaniline in acetic acid (200 parts). The batch being stirred for 5 hours or longer until coupling is finished. The pH value is adjusted to 4 at a temperature below 10° C., with 4N sodium acetate solution and the dyestuff is isolated by filtration and washed with water. In some cases, it may be necessary, in order to remove starting material and impurities, to treat the dyestuff with acetone and to precipitate the dissolved dyestuff with water. The dyestuff obtained, which corresponds to the formula

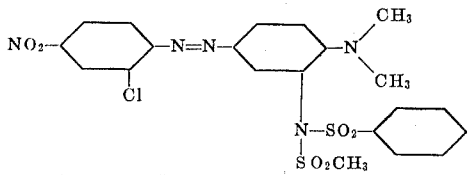

dyes polyester fibers bluish red, possessing excellent properties of fastness when applied in the form of an aqueous dispersion.

Example XXXV 1.63 Parts of 2-cyano-4-nitroaniline are diazotized in the manner described in example XXXIV but with an addition of 5 parts by volume of acetic acid. The filtered solution of the diazonium salt is coupled with 3.54 parts of meta-(N'-benzene-sulfonyl-N'-methane-sulfonyl)-amino-N,N-dimethylaniline in the manner described in example XXXIV. The dyestuffs obtained, which correspond to the formula

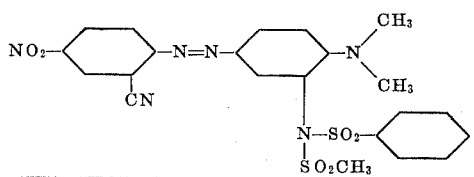

dyes polyester fibers violet (high temperature) and reddish violet (pad-dry heat), possessing excellent properties of fastness when applied in the form of an aqueous dispersion.

Example XXXVI 2.04 Parts of 2:6-dichloro-4-nitroaniline are diazotized in the manner described in example XXXIV. The filtered solution of the diazonium salt is coupled with 3.54 parts of meta-(N'-benzenesulfonyl-N'-methane-sulfonyl)-amino-N,N-dimethylaniline in the manner described in example XXXIV. The dyestuff obtained, which corresponds to the formula

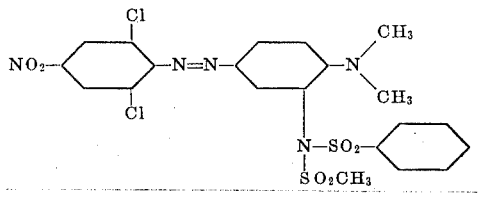

dyes polyester fibers reddish brown possessing excellent properties of fastness when applied in the form of an aqueous dispersion.

Example XXXVII

To a solution of m-amino-N,N-dimethylaniline (13.6 parts) in dry benzene (400 parts) was added p-toluene sulfonyl chloride (20.95 parts) and an acid binding agent, triethyl amine (30.0 parts). The solution was boiled at reflux for 15 to 20 hours. It was filtered and the solvent was removed under reduced pressure. The solid was crystallized from alcohol (95 percent) to give white needles of meta-(N'p-toluene sulfonyl)-amino-N,N-dimethylaniline.

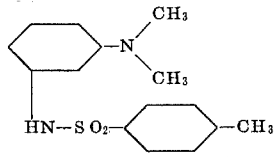

To a solution of meta-(N'p-toluene sulfonyl)-amino-N,N-dimethylaniline (18.1 parts) in dry benzene (400 parts) was added methane sulfonyl chloride (15.0 parts) and an acid binding agent, triethyl amine (23.0 parts). The solution was boiled at reflux for 20 hours and worked up in the manner described above. It crystallized from alcohol (95 percent) to give meta-(N'-p-toluene-sulfonyl-N'-methane-sulfonyl)-N,N-dimethylaniline, m.p. 137°–138° C.

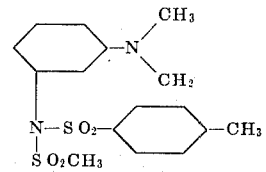

1.73 Parts of 2-chloro-4-nitroaniline are diazotized in the manner described in example XXXIV. The filtered solution of the diazonium salt is coupled with 3.68 parts of meta-(N'-p-toluene-sulfonyl-N'-methane-sulfonyl)-N,N-dimethylaniline in acetic acid (200 parts) in the manner described in example XXXIV. The dyestuff obtained which corresponds to the formula

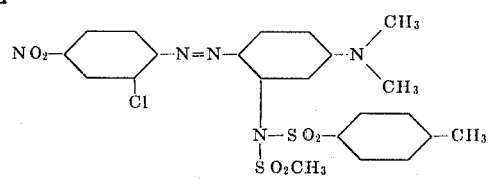

dyes polyester fibers bluish red.

Example XXXVIII 1.63 Parts of 2-cyano-4-nitroaniline are diazotized in the manner described in example XXXIV but with an addition of 5 parts by volume of acetic acid. The filtered solution is coupled with 3.68 parts of meta-(N'-p-toluene-sulfonyl-N'-methanesulfonyl)-amino-N,N-dimethylaniline in acetic acid (200 parts), in the manner described in example XXXIV. The dyestuff obtained, which corresponds to the formula

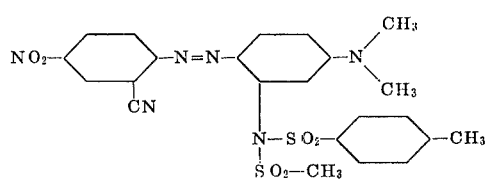

dyes polyester fiber reddish violet.

Example XXXIX 2.04 Parts of 2:6-dichloro-4-nitroaniline are diazotized in the manner described in example XXXIV. The filtered solution of the diazonium salt is coupled with 3.68 parts of meta-(N'-p-toluene-sulfonyl-N'-methanesulfonyl)-amino-N,N-dimethylaniline in acetic acid (200 parts) in the manner described in example XXXIV. The dyestuff obtained, which corresponds to the formula

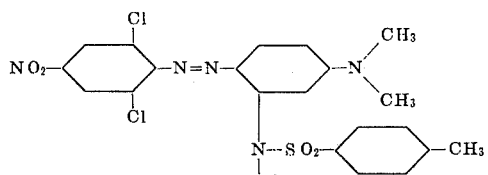

dyes polyester fiber reddish brown.

Example XXXX

To a solution of m-amino-N,N-diethylaniline (16.4 parts) in dry benzene (400 parts) was added benzene sulfonyl chloride (19.5 parts) and an acid binding agent, triethyl amine (28.0 parts). The solution was boiled at reflux for 20 hours. The solvent was removed under reduced pressure and the solid was crystallized from dilute alcohol, to given meta-(N'-benzene-sulfonyl)-amino-N,N-diethylaniline.

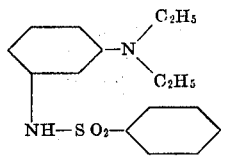

To a solution of meta-(N'-benzenesulfonyl)-amino-N,N-diethylaniline (16.0 parts) in dry benzene (400 parts) was added methanesulfonyl chloride (23.0 parts) and an acid binding agent, triethyl amine (30 parts). The solution was boiled at reflux for 24 hours and worked up in the manner described above. It crystallized from alcohol (95 percent) to give meta-(N'-benzene-sulfonyl-N'-methane-sulfonyl)-amino-N,N-diethyl-aniline, m.p. 107°–108° C.

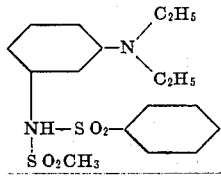

1.73 Parts of 2-chloro-4-nitroaniline are diazotized in the manner described in example XXXIV. The filtered solution is coupled with 3.82 parts of meta-(N'-benzene-sulfonyl-N'-methane-sulfonyl)-amino-N,N-diethylanaline in acetic acid (200 parts) in the manner described in example XXXIV. The dyestuff obtained which corresponds to the formula

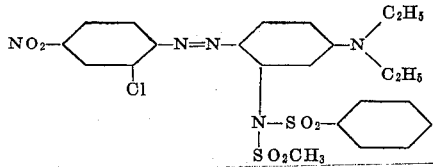

dyes polyester fiber bluish pink (high temperature) and bluish red (pad-dry heat).

Example XXXXI 1.63 Parts of 2-cyano-4-nitroaniline are diazotized in the manner described in example XXXIV but with an addition of 5 parts by volume of acetic acid. The filtered solution is coupled with 3.82 parts of meta-(N'-benzene-sulfonyl-N'-methane-sulfonyl)-amino-N,N-diethylaniline in acetic acid (200 parts) in the manner described in example XXXIV. The dyestuff obtained which corresponds to the formula

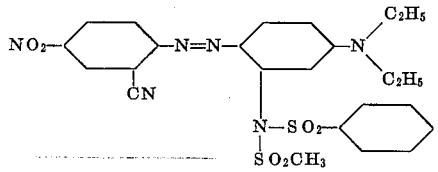

dyes polyester fiber Violet.

Example XXXXII 2.04 Parts of 2:6-dichloro-4-nitroaniline are diazotized in the manner described in example XXXIV. The filtered solution of the diazonium salt is coupled with 3.82 parts of meta-(N'-benzene-sulfonyl-N'-methane-sulfonyl)-amine-N,N-diethylaniline in acetic acid (200 parts) in the manner described in example XXXIV. The dyestuff obtained which corresponds to the formula

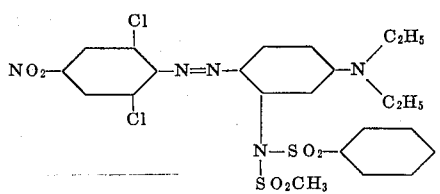

dyes polyester fiber reddish brown.

Example XXXXIII

To a solution of m-amino-N,N-diethylaniline (16.4 parts) in dry benzene (400 parts) was added p-toluene sulfonyl chloride (20.95 parts) and an acid binding agent, triethyl amine (28.0 parts). The solution was boiled at reflux for 22 hours. It was filtered. The solvent was removed under reduced pressure and the brown solid was crystallized from dilute alcohol to give meta-(N'-p-toluene-sulfonyl)amino-N,N-diethylaniline.

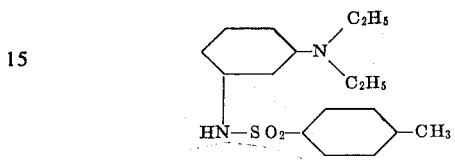

To a solution of meta-(N'-p-toluene-sulfonyl)-amino-N,N-diethylaniline (20.5 parts) in dry benzene (400 parts) was added methanesulfonyl chloride (15.0 parts) and an acid binding agent, triethylamine (23.0 parts). The solution was boiled at reflux for 20 hours and worked up in the manner described above. It crystallized from alcohol (95 percent) to give white needles of meta-(N'-p-toluene-sulfonyl-N'-methane-sulfonyl)-amino-N,N-diethylaniline, m.p. 143°–144° C.

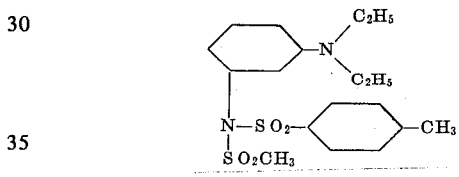

1.73 Parts of 2-chloro-4-nitroaniline are diazotized in the manner described in example XXXIV. The filtered solution is coupled with 3.96 parts of meta-(N'-p-toluene-sulfonyl-N'-methane-sulfonyl)-amino-N,N-diethylaniline in acetic acid (200 parts) in the manner described in example XXXIV. The dyestuff obtained, which corresponds to the formula

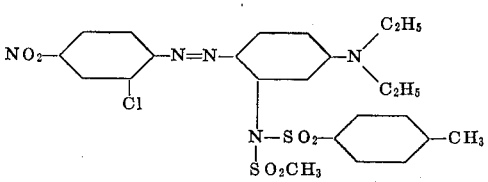

dyes polyester fiber bluish pink (high temperature) and bluish red (pad-dry heat).

Example XXXXIV 1.63 Parts of 2-cyano-4-nitro-aniline are diazotized in the manner described in example XXXIV but with an addition of 5 parts by volume of acetic acid. The filtered solution is coupled with 3.96 parts of meta-(N'-p-toluene-sulfonyl-N'-methane-sulfonyl)-amino-N,N-diethylaniline in acetic acid (200 parts) in the manner described in example XXXIV. The dyestuff obtained which corresponds to the formula

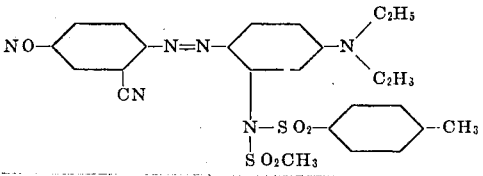

dyes polyester fiber violet.

Example XXXXV 2.04 Parts of 2:6-dichloro-4-nitroaniline are diazotized in the manner described in example XXXIV. The filtered solution of the diazonium salt is coupled with 3.95 parts of meta- (N'-p-toluene-sulfonyl-N'in acetic acid (200 parts) in the manner described in example XXXIV. The dyestuff obtained, which corresponds to the formula

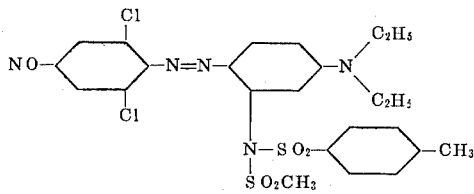

dyes polyester fiber reddish brown

Example XXXXVI

N,N-di-(2-cyanoethyl)-m-nitroaniline was reduced with tin and hydrochloric acid to give the correspond amine; which crystallized from water m.p. 96°–97° C.

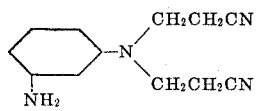

To a solution of -m-amino-N,N-di-(2-cyanoethyl)-aniline (10.7 parts) in dry benzene (500 parts) was added methane-sulfonyl chloride (17.25 parts) and an acid binding agent, triethylamine (20.2 parts).

The solution was boiled at reflux for 24 hours. The solvent was removed under reduced pressure. The brown solid was washed several times with water to remove triethylamine hydrochloride. The solid had m.p.>206° C.

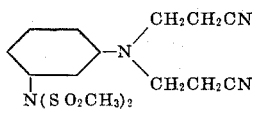

2.16 Parts of 2-chloro-4-nitroaniline are diazotized at room temperature in the manner described in example XXXIV. The filtered solution of the diazonium salt is coupled with 4.63 parts of meta-bis-(N'-methane-sulfonyl)-amino-N,N-di(2-cyanoethyl)-aniline in acetic acid (150 parts) in the manner described in example XXXIV. The dyestuff obtained which corresponds to the formula

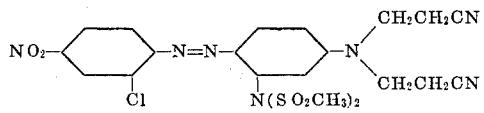

dyes polyester fiber scarlet (high temperature) and yellowish red (pad-dry heat).

Example XXXXVII 2.04 parts of 2-cyano-4-nitro-aniline are diazotized in the manner described in example XXXIV but with an addition of 5 parts by volume of acetic acid. The filtered solution is coupled with 4.63 parts of meta-bis-(N'-methane-sulfonyl)-amino-N,N-di(2-cyanoethyl)-aniline in acetic acid (150 parts) in the manner described in example XXXIV. The dyestuff obtained which corresponds to the formula

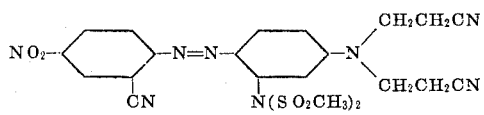

dyes polyester fiber red violet (high temperature) and dull bluish red (pad-dry heat).

Example XXXXVIII

To a suspension of m-nitroaniline in dry benzene, was added a little more than the calculated amount of methane sulfonyl chloride and an acid binding agent, triethylamine. The mixture was boiled at reflux for 15 hours and worked up in the usual way to give meta-bis-(N'-methane-sulfonyl)-amino-m-nitroaniline, m.p. 168° C.

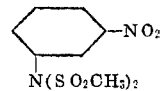

It was reduced with R/Ni as catalyst at 50° C. to give meta-bis-(N'-methane-sulfonyl)-amino-phenylene diamine, which crystallized from alcohol, m.p. 200°–201° C.

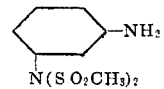

To a suspension of meta-bi-(N'-methane-sulfonyl)-aminophenylene diamine in water, was passed ethylene oxide at 85° C. for 5 to 6 hours. A clear solution was obtained. The hot solution was filtered and on cooling, it gave meta-bis-(N'-methane-sulfonyl)-amino-N,N-di-(2-hydroxyethyl)-aniline as white plates, m.p. 157°–158° C.

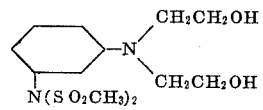

1.73 Parts of 2-chloro-4-nitroaniline are diazotized in the manner described in example XXXIV. The filtered solution of the diazonium salt is coupled with 3.52 parts of meta-bis-(N'-methane-sulfonyl)-amino-N,N-di-(2-hydroxyethyl)-aniline in water (300 parts) and alcohol (50 parts), in the manner described in example XXXIV. The dyestuff obtained which corresponds to the formula

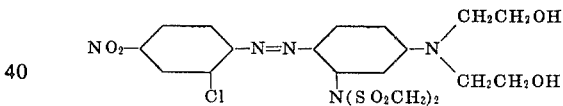

dyes polyester fiber bluish pink (high temperature) and reddish blue (pad-dry heat).

Example IL 1.63 Parts of 2-cyano-4-nitroaniline are diazotized in the manner described in example XXXIV but with an addition of 5 parts of acetic acid. The filtered solution is coupled with 3.52 parts of meta-bis-(N'-methane-sulfonyl)-amino-N,N-di-(2-hydroxyethyl)-aniline in water (300 parts) and alcohol (50 parts) in the manner described in example XXXIV. The dyestuff obtained which corresponds to the formula

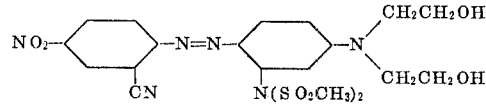

dyes polyester fiber violet (high temperature) and reddish violet (pad-dry heat).

Example L 2.04 Parts of 2:6-dichloro-4-nitroaniline are diazotized in the manner described in example XXXIV. The filtered solution is coupled with 3.52 parts of meta-bi-(N'-methane-sulfonyl)-amino-N,N-di-(2-hydroxy-ethyl)-aniline in water (300 parts) and alcohol (50 parts) in the manner described in example XXXIV. The dyestuff obtained which corresponds to the formula

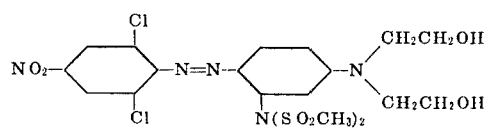

dyes polyester fiber dull bluish red (high temperature) and reddish brown (pad-dry heat).

Example LI

Meta-bis-(N'-methane-sulfonyl)-amino-N,N-di-(2-hydroxyethyl)-aniline was refluxed with acetic anhydride to give meta-bis-(N'-methane-sulfonyl-amino-N,N-di(2-acetoxyethyl)-aniline which crystallized from dilute alcohol, m.p. 108°–109° C.

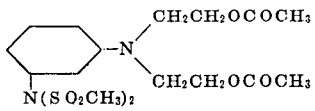

1.73 Parts of 2-chloro-4-nitroaniline are diazotized in the manner described in example XXXIV. The filtered solution is coupled with 4.36 parts of meta-bis-(N'-methane-sulfonyl)-amino-N,N-di-(2-acetoxy-ethyl)-aniline in acetic acid (200 parts) in the manner described in example XXXIV. The dyestuff obtained which corresponds to the formula

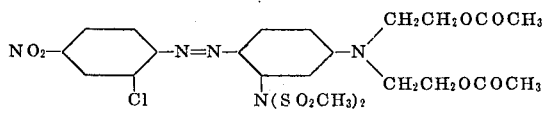

dyes polyester fiber red (high temperature) and yellowish red (pad-dry heat).

Example LII 1.63 Parts of 2-cyano-4-nitroaniline are diazotized in the manner described in example XXXIV but with an addition of 5 parts of acetic acid. The filtered solution is coupled with 4.36 parts of meta-bis-(N'-methane-sulfonyl-amino-N,N-di(2-acetoxy-ethyl)-aniline in acetic acid (200 parts) in the manner described in example XXXIV. The dyestuff obtained which corresponds to the formula

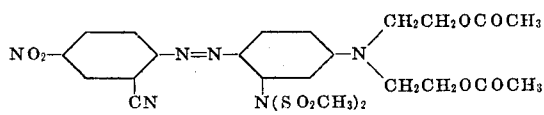

dyes polyester fiber reddish violet (high temperature) and bluish red (pad-dry heat).

Example LIII 2.04 parts of 2:6-dichloro-4-nitroaniline are diazotized in the manner described in example XXXIV. The filtered solution is coupled with 4.36 parts of meta-bis-(N'-methane-sulfonyl)-amino-N,N-di-(2-acetoxy-ethyl)-aniline in acetic acid (200 parts) in the manner described in example XXXIV. The dyestuff obtained which corresponds to the formula

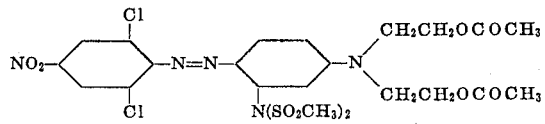

dyes polyester fiber yellowish red (high temperature) and reddish orange (pad-dry heat).

In all examples the shades indicated were obtained by high-temperature dyeing, except where otherwise stated.

We claim:
1. A monoazo dyestuff as claimed in claim 30, wherein R and R' are identical alkyl residues containing up to four carbon atoms.
2. A monoazo dyestuff of the formula

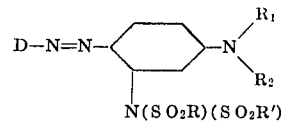

wherein D represents a diazo residue of the benzene series, R is lower alkyl, R' is lower alkyl or phenyl which may be substituted by bromine or methyl, each of $R_1$ and $R_2$ is alkyl containing up to four carbon atoms, alkyl carbonyloxyalkyl containing up to five carbon atoms, hydroxyethyl, or cyanoethyl.

3. A monoazo dyestuff according to claim 2 which corresponds to the formula

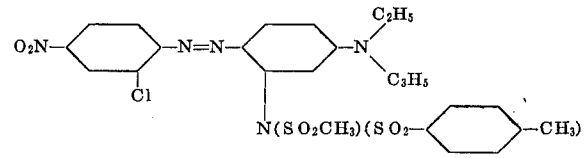

4. A monoazo dyestuff according to claim 2 which corresponds to the formula

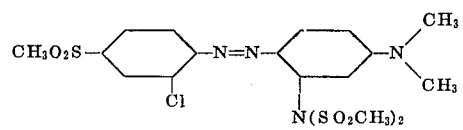

5. A monoazo dyestuff according to claim 2 which corresponds to the formula

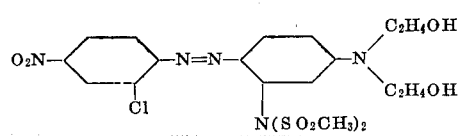

6. A monoazo dyestuff according to claim 2 which corresponds to the formula

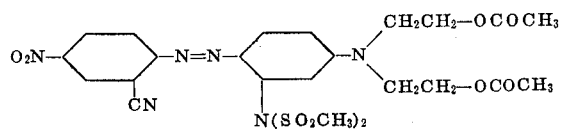

UNITED STATES PATENT OFFICE
CERTIFICATE OF CORRECTION

Patent No. 3,625,938         Dated December 7, 1971

Inventor(s) Ved Parkash Kubba

It is certified that error appears in the above-identified patent and that said Letters Patent are hereby corrected as shown below:

Column 20, line 6, delete "30" and substitute --- 2 ---;

the middle portion of the formula of claim 3 should read

---

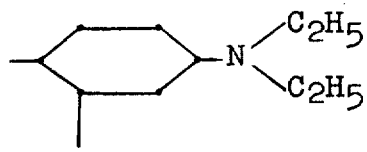

Signed and sealed this 27th day of June 1972.

(SEAL)
Attest:

EDWARD M. FLETCHER, JR.
Attesting Officer

ROBERT GOTTSCHALK
Commissioner of Patents